United States Patent [19]
Yamazaki

[11] 3,724,345
[45] Apr. 3, 1973

[54] SYNCHRONIZER IN CAMERA
[75] Inventor: Keiji Yamazaki, Izumi, Osaka Prefecture, Japan
[73] Assignee: Minolta Camera Kabushiki Kaisha, Osaka, Japan
[22] Filed: July 8, 1971
[21] Appl. No.: 160,637

[52] U.S. Cl.................95/11.5 R, 95/10 C, 95/11 L, 240/1.3
[51] Int. Cl..............................................G03b 15/04
[58] Field of Search......95/11 R, 11.5 R, 10 C, 11 L; 240/1.3; 431/92, 93

[56] References Cited

UNITED STATES PATENTS 3,616,735  11/1971  Bresson............................95/11.5 R
3,602,120  8/1971  Galbraith...........................95/11.5 R

*Primary Examiner*—Robert P. Greiner
*Attorney*—Stanley Wolder

[57] ABSTRACT

A synchronizer includes a synchronizing member whose driven portion is positioned in the path of movement of a sector actuating member in operative relation to a shutter release member only when an indicator for flash photographing operation is located at the position indicating the need for flash photography which indicator shifts in accordance with the brightness of the subject. The synchronizing member is further formed with a trigger portion for actuating a striking member for firing a flashlamp. Only when the indicator indicates the need for flash photography, the synchronizing member is moved in operative relation with the sector actuating member to fire the flashlamp.

4 Claims, 5 Drawing Figures

INVENTOR
KEIJI YAMAZAKI
BY Stanley Wolder
ATTORNEY

INVENTOR
KEIJI YAMAZAKI
By Stanley Wolder
ATTORNEY

SYNCHRONIZER IN CAMERA

BACKGROUND OF THE INVENTION

The present invention relates to a synchronizer in a camera for taking a flash photograph by using a flash unit incorporating therein at least one set of a percussion-ignitable flashlamp and a striking member retained at the tensioned position for striking the flashlamp, more particularly to a synchronizer capable of firing the flashlamp in synchronism with a shutter opening operation only when flash photography is necessary and automatically effecting changeover from an ordinary photographing operation without flashlight to a flash photographing operation by flashlight.

With cameras for taking flash photographs by using a flash unit such as above-mentioned, the conventional synchronizer equipped with means for automatically changing over an ordinary photographing operation to a flash photographing operation includes a striker triggering member which is arrested by a first latch member and a second latch member, the first latch member being in operative relation to the pointer of an exposure meter serving to indicate the need for flash photography, the second latch member being coupled with a sector actuating member, the arrangement being such that the triggering member is released from the two latch members for operation only when a flash photograph is to be taken so as to free the striker from the tensioned position and permit the same to strike the flashlamp for firing. Accordingly, the synchronizer is complex in construction and the coupling mechanism is therefore complex to result in the drawback that the synchronizer requires a large space within the interior of the camera. Further even when a photograph is taken without using flashlight, the second latch member is moved by the sector actuating member, so that the resistance produced by the movement of the second latch member exerts an adverse effect on the shutter speed or the like, making it difficult to achieve an accurate exposure.

SUMMARY OF THE INVENTION

An object of the present invention is to provide a synchronizer of the type described which is extremely simple in construction.

Another object of this invention is to provide a structure wherein a synchronizing member for triggering a flashlight striking member is operatively related to the movement of a sector actuating member only when a flash photographing operation is necessary and is retracted from the path of movement of the sector actuating member to free the sector actuating member from excessive load during an ordinary photographing operation.

In accordance with this invention there is provided a synchronizing member which detects the position of a member for indicating the need for flash photographing in operative relation to a shutter release member and which is displaced a varying amount for the detecting operation in corresponding relation to the detected position of the indicating member.

Serving as the flash photography indicating member is the pointer of an exposure meter which is moved generally in accordance with the brightness of the subject, more specifically in accordance with the brightness of the subject in which exposure conditions such as the shutter speed, diaphragm aperture value and film speed are involved.

The synchronizing member is retained at a predetermined position by a shutter release member and, when freed from the shutter release member, it is initiated into rotation to detect the position of the pointer of the exposure meter and move a stepwisely varying amount in accordance with the position of the pointer detected.

The synchronizing member is provided with a driven portion to be brought to the path of movement of the sector actuating member only when a flash photographing operation is necessary and to be retracted from the path during an ordinary photographing operation and a trigger portion for releasing a striking member for firing a flashlamp when the synchronizing member follows the movement of the sector actuating member during a flash photographing operation.

Thus the synchronizing member in accordance with this invention operates to fire a flashlamp in operative relation to the sector actuating member and therefore in synchronism with a shutter opening operation only when a flash photographing operation is needed and, during an ordinary photographing operation, the synchronizing member is positioned independently of the sector actuating member without subjecting the sector actuating member to an excess load during its operation so as to eliminate any possible adverse effect on the shutter speed.

Further the synchronizer of this invention is extremely simple in construction with a minimized number of parts for synchronization and the space occupied by the synchronizer is materially reduced to ensure an outstanding advantage in that the camera can be manufactured at a low cost in a compact form.

Other objects and characteristics of the present invention will become more apparent from the following description.

DESCRIPTION OF THE PREFERRED EMBODIMENT

Figure 1:
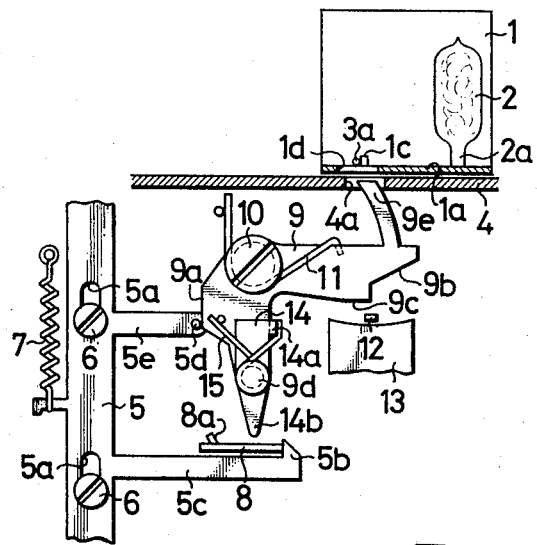
FIG. 1 is a front view showing the principal part of an embodiment of this invention.
Figure 2:
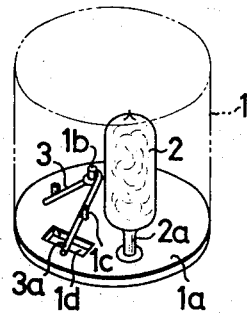
FIG. 2 is a perspective view showing a flash unit to be mounted on the camera of this invention.

As illustrated in the drawing, a flash unit 1 includes a flashlamp 2 mounted on its bottom plate 1a and a striking member 3 fixed in position with its base portion 3a wound around a pin 1b and having a free end 3a retained in its tensioned position by a pin 1c. The flashlamp 2 is fired by being violently hit on its leg portion 2a with the free end of the striking member 3 when it is freed from its tensioned position. As will be apparent from the above description, a highly resilient wire such as a piano wire may generally be used for the striking member 3. The bottom plate 1a is further formed with a window 1d at the position where the free end 3a of the striking member 3 is to be located, the window 1d being in corresponding relation to a window 4a formed in the outer frame 4 of the camera body.

The flash unit described above incorporates therein only one set of the flashlamp and its striking member. However, the flash unit may include therein a plurality of sets of flashlamps and striking members therefor, in which case, although not illustrated, the flash unit is rotatably mounted on the camera body and the flashlamps and their striking members are disposed equidistantly along a circumference concentrical with the center of rotation thereof, with windows formed at positions where the free ends of the striking members are located, the arrangement being such that after the firing of a flashlamp, the unit is rotated a predetermined angle in operative relation with a shutter cocking operation so as to direct an unfired flashlamp to the subject for the subsequent flash photographing operation.

Either type of the flash units above may be used with the present invention to achieve exactly the same function and effect.

A release member 5 is supported in vertically movable manner at a suitable portion of the camera body on pins 6 engaged in slots 5a formed in the release member 5 and is urged upward by a return spring 7. Depression of a release button (not shown) projecting outwardly from the camera body moves the release member 5 downward against the action of the spring 7, while when relieved of the depression or upon completion of an exposure making operation it is returned upward by the spring 7.

The release member 5 is provided with an arm 5c formed with a hook 5b at its distal end and an arm 5e having an arresting pin 5d. The arm 5c serves to retain a sector actuating member 8 at its tensioned position with its hook 5b. The arm 5e engages the cam portion 9a of a synchronizing member 9 with the arresting pin 5d to retain the member 9 at its neutral position. The above-mentioned shutter release operation unlatches the synchronizing member 9, and the further downward movement of the release member 5 frees the sector actuating member 8 from its tensioned position.

As already well known, the sector actuating member 8 is brought into engagement with the hook 5b of the release member 5 by a shutter cocking operation while an unillustrated operating spring for the sector initiating member is thereby tensioned. When freed from the engagement, the sector actuating member 8 is moved rightward to actuate an unillustrated sector for a shutter opening operation.

The synchronizing member 9 is pivoted in the interior of the camera body as at 10 and urged by a spring 11 in a clockwise direction in the drawing, with its cam portion 9a in engagement with the arresting pin 5d on the release member 5. The synchronizing member 9 is formed at its distal end with detecting portions 9b and 9c for detecting the position of the pointer 12 of an exposure meter which serves as an indicator for a flash photographing operation. When freed from retention by the arresting pin 5d upon a shutter release operation, the member 9 rotates clockwise under the action of the spring 11 and detects the position of the pointer 12 with either one of the detecting portions 9b and 9c as shown in FIGS. 3 or 4, clamping the pointer 12 against a fixed plate 13, whereupon the member 9 is prevented from any further clockwise rotation.

Figure 3:
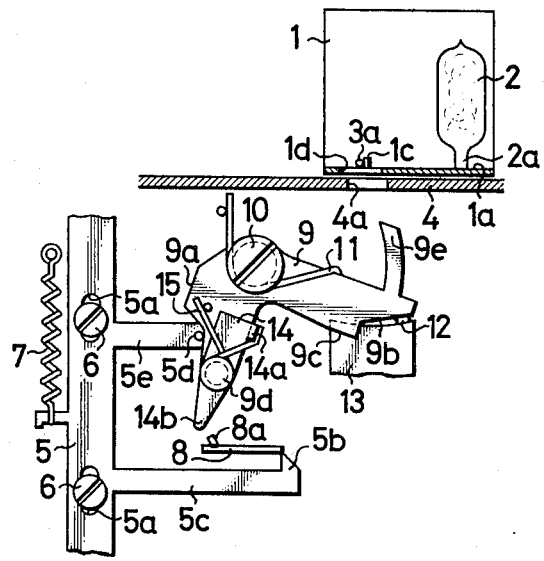
FIGS. 3 to 5 are views illustrating the operation of the embodiment shown in FIG. 1, FIG. 3 showing a synchronizing member in detecting position when a flash photographing operation is not necessary, FIG. 4 showing the same when a flash photographing operation is necessary, FIG. 5 showing the embodiment the moment when a flashlamp is fired.
Figure 4:
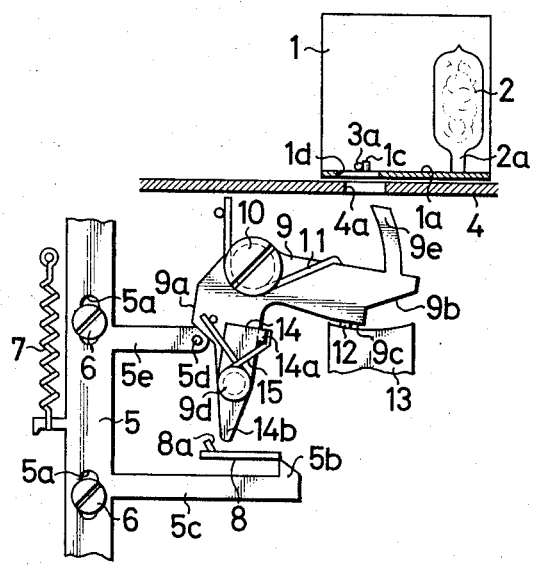

As already known, the pointer 12 of the exposure meter moves leftward or rightward in the drawing in accordance with the brightness of the subject: it is located on the right hand position illustrated in FIG. 3 for a bright subject, while, for a subject having a low brightness, it is located on the left hand position as shown in FIG. 4.

Accordingly, when an ordinary picture can be taken without employing flashlight, the detecting portion 9b detects the pointer 12, but if a flash picture has to be taken the detecting portion 9c detects the pointer 12. The detecting portions 9b and 9c which are provided in a stepped form as seen in the drawing permit the synchronizing member 9 to be displaced stepwise for detecting operation in corresponding relation to whether a flash photographing operation is necessary or not.

The synchronizing member 9 is further provided with a driven member 14 pivoted at 9d on the other end thereof and is urged counterclockwise by a spring 15, with a lug 14a in contact with one side of the synchronizing member 9. The lug 14a thus prevents the counterclockwise rotation of the driven member 14 on the synchronizing member 9. The driven member 14 has a driven portion 14b which is position in the path of movement of a projection 8a on the upper face of the sector actuating member 8 in the state of FIG. 1 wherein the shutter is in cocked position.

When the detecting portion 9b of the synchronizing member 9 detects the pointer 12, the synchronizing member rotates in a clockwise direction, causing the driven portion 14b of the driven member 14 to retract from the path of movement of the projection 8a of the sector actuating member 8, whereas if the detector 9c detects the pointer 12, the resulting clockwise rotation of the synchronizing member 9 which is smaller than in the above case permits the driven portion 14b to position still in the path of movement of the projection 8a of the sector actuating member 8.

The synchronizing member 9 is further formed with a hornlike trigger arm 9e extending upward in opposite relation to the detecting portions 9b and 9c, the arrangement being such that the upper end of the arm 9e can passes through the window 4a of the outer frame 4 into the window 1d formed in the bottom plate 1a of the flash unit and positioned on the upper face of the outer frame 4.

Figure 5:
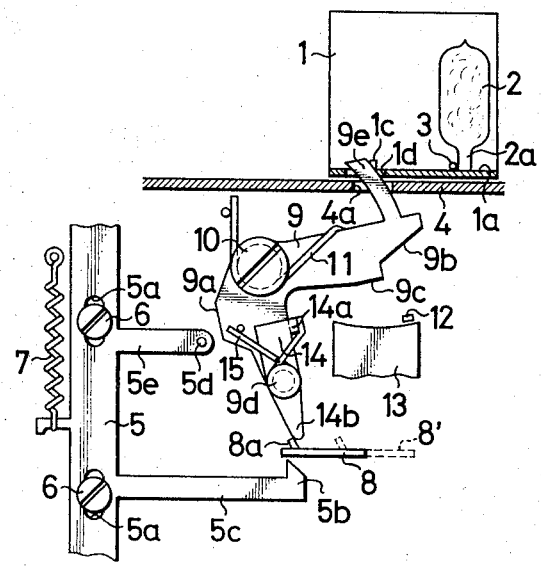

When the synchronizing member 9 detects the pointer 12 with the detecting portion 9c and is thereby prevented from clockwise rotation, a further downward movement of the release member 5 permits the hook 5b to release the sector actuating member 8, whereupon the member 8 moves rightward as shown in FIG. 5, thereby bringing the projection 8a thereon into engagement with the driven portion 14b of the driven member 14 at the same time to rotate the synchronizing member 9 in a counterclockwise direction along with the driven member 14.

The rightward movement of the sector actuating member 9 actuates the sector (not shown) to open the shutter, while the counterclockwise rotation of the synchronizing member 9 causes the trigger arm 9e to push up the free end 3a of the striking member 3 and thereby release the striking member 3 from the pin 1c in synchronism with the shutter opening action. The striking member 3 therefore violently strikes the leg 2a of the flashlamp 2 with its free end 3a to fire the flashlamp 2. The firing action is of course timed with full opening of the shutter effected by the sector actuating member 8.

As indicated by a broken line 8' in FIG. 5, the sector actuating member 8 further moves rightward to disengage the projection 8 from the driven member 14 and also release the sector for a shutter closing action. When thus released, the synchronizing member 9 is urged into a clockwise rotation again, and the upward return of the release member 5 permits the arresting pin 5d to retain the synchronizing member 9 at the position shown in FIG. 1.

As will be apparent from the foregoing description, the displacement of the synchronizing member 9 for detecting operation varies in relation to the position of the pointer 12, causing the driven portion thereof to retract from the path of movement of the sector actuating member 8 when a photograph can be taken without firing the flashlamp 2, the displacement of the synchronizing member 9 further being such that only when a flash photographing operation is necessary the member 9 is allowed to move in operative relation to the sector actuating member 8 to trigger the striking member 3 and thereby fire the flashlamp 2 in synchronism with a shutter opening action. Thus, the operation described above is fully automated in operative relation to a shutter release action, and the synchronizing member 9 is capable of effecting automatic changeover from an ordinary photographing operation to a flash photographing operation and vice versa, further ensuring satisfactory operation to trigger the striking member. The synchronizing member 9 therefore contributes a great deal to the simplification of the mechanism.

Immediately after a flash photograph has been taken subsequent to a shutter release action, the sector actuating member 8 is located at a right hand position beyond the driven member 14 of the synchronizing member 9. The member 8 will then be moved leftward by a shutter cocking operation. During this movement, the projection 8a hits the driven portion 14b of the driven member 14 and urges the driven member 14 into clockwise rotation about the pin 9d. Immediately before the sector actuating member 8 reaches the position shown in FIG. 1, the projection 8a releases the driven portion 14b, whereupon it is returned to the state of FIG. 1 under the action of the spring 15. Further upon reaching the position shown in FIG. 1, the sector actuating member 8 is latched by the hook 5b of the release member 5.

What is claimed is:

1. A flash synchronizing mechanism in a camera including a shutter comprising;
   a shutter release member movable between a retracted position and a shutter release advanced position;
   a percussion ignitable flashlamp and a striking member releasably retained in a tensioned position and movable along a path to strike said flashlamp;
   a flash photography indicating member shiftable between a flash position and a non-flash position in accordance with the brightness of an object;
   means including a shutter actuating member responsive to the advance of said shutter release member to its advanced position to effect the shutter opening operation; and
   synchronizing means for releasing said striking member including a synchronizing member movable between positions in and out of drive actuatable relationship with said shutter actuating member in response to the location of said flash indicating member in said flash and non-flash indicating positions respectively and movable when in said drive actuatable relationship to a position releasing said striking member by the shutter opening movement of said shutter actuating member.

2. The synchronizing mechanism of claim 1 wherein said synchronizing member comprises a stepped portion including first and second sections offset in the direction of movement of said synchronizing member and said indicating member flash and non-flash positions are in alignment with said first and second sections respectively in the direction of movement of said synchronizing member.

3. The synchronizing mechanism of claim 1 including means actuable by said release member for releasably locking said synchronizing member in a neutral position when said shutter is in its cocked position and releasing said synchronizing member upon the initial advance of said shutter release member.

4. The synchronizing mechanism as set forth in claim 1 wherein said flash photography indicating member includes a pointer of an exposure meter.

* * * * *